(12) United States Patent
Usselman et al.

(10) Patent No.: US 6,897,417 B1
(45) Date of Patent: May 24, 2005

(54) FOOT HEATING SYSTEM

(76) Inventors: Donald E. Usselman, 16 W. Chestnut St., Norwalk, OH (US) 44857; Jeanne K. Usselman, 16 W. Chestnut St., Norwalk, OH (US) 44857

( * ) Notice: Subject to any disclaimer, the term of this patent is extended or adjusted under 35 U.S.C. 154(b) by 0 days.

(21) Appl. No.: 10/918,122

(22) Filed: Aug. 16, 2004

(51) Int. Cl.$^7$ ............................................. H05B 3/34
(52) U.S. Cl. ................. 219/528; 219/213; 219/527; 219/548; 219/202
(58) Field of Search ................. 219/528, 529, 219/202, 213, 435, 437, 548, 549

(56) References Cited

U.S. PATENT DOCUMENTS

| | | | | |
|---|---|---|---|---|
| 1,701,973 A | * | 2/1929 | Gehrs | 219/535 |
| 2,844,696 A | * | 7/1958 | Custer, Jr. | 219/213 |
| 3,255,337 A | * | 6/1966 | Willat | 219/528 |
| 3,634,655 A | * | 1/1972 | Jordan | 219/527 |
| 4,967,057 A | * | 10/1990 | Bayless et al. | 219/213 |
| 4,995,835 A | | 2/1991 | Cunningham et al. | |
| 5,052,283 A | * | 10/1991 | Altus | 454/144 |
| D337,473 S | | 7/1993 | Deandrea, Jr. | |
| 5,431,585 A | | 7/1995 | Fan | |
| 5,998,770 A | * | 12/1999 | Sundby | 219/528 |
| 6,318,796 B1 | | 11/2001 | Felsen | |
| 6,481,877 B1 | * | 11/2002 | Bello, Jr. | 362/488 |
| 6,547,301 B1 | | 4/2003 | Keller | |
| 6,676,028 B2 | * | 1/2004 | Jacobson | 237/77 |

* cited by examiner

Primary Examiner—Robin O. Evans
Assistant Examiner—Vinod Patel
(74) Attorney, Agent, or Firm—Donald R. Schoonover

(57) ABSTRACT

Each mat of a plurality of mats has an electrical resistance heater embedded therein between a layer of vinyl and a layer of cloth-like material. The mats are located in a motor vehicle and are connected to the power system of the motor vehicle via a cigarette lighter-type attachment and are controlled by a control element. Each mat has a crown and a gutter so water generated by melting snow or ice is controlled and prevented from running off the mat.

3 Claims, 1 Drawing Sheet

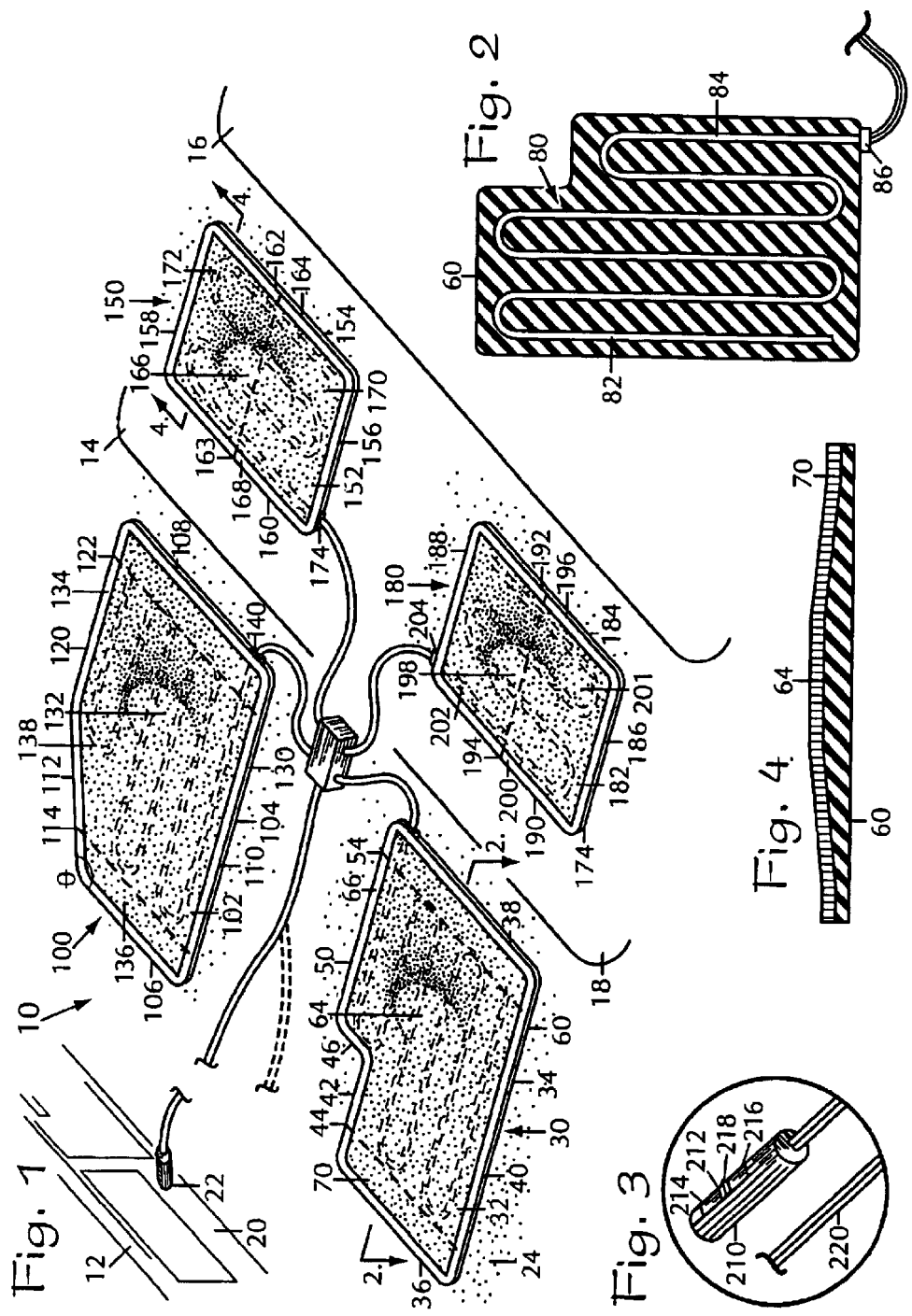

FOOT HEATING SYSTEM

BACKGROUND OF THE INVENTION

1. Field of the Invention

The present invention relates to the general art of land vehicles, and to the particular field of mats and covers for land vehicles.

2. Discussion of the Related Art

Many people must work outside during cold or inclement weather. Many people may also have to drive in such weather for long periods of time. These people often suffer from the cold or inclement weather. One part of a person's body that is especially susceptible to such weather is the feet. A person's feet often are the main portion of the body that is in contact with the coldest elements, such as the ground.

People often have special boots, or special socks for such conditions. However, even such special clothing may not be sufficient if the exposure is long enough.

Therefore, there is a need for a system that can maintain a person's feet warm even under severe conditions.

Many people have access to an automobile during inclement weather, either as a driver or as a passenger or simply as a temporary shelter. Operating the heating system of the automobile may provide some relief, however, this may not be sufficient if the exposure is long enough or the weather severe enough. This is especially true for the person's feet, which may not receive sufficient warm air from a vehicle heating system to efficiently and quickly warm the person.

Therefore, there is a need for a system that can maintain a person's feet warm and which can be efficiently used in a motor vehicle, such as an automobile.

Furthermore, if a land vehicle is used as a shelter for such purposes, it is often used by a plurality of people. Some of the people will be located in the front seat of the vehicle and some of the people will be located in the rear seat of the vehicle. It is more efficient if all of these people can be warmed at once and in an efficient manner. Some present vehicle heating systems do not warm the passengers in the rear of the vehicle as efficiently as the passengers in the front of the vehicle.

Therefore, there is a need for a system that can efficiently warm the feet of people located in both the front and rear of the vehicle.

Still further, some conditions may require maximum heating while other conditions may require minimum heating.

Therefore, there is a need for a system that can efficiently warm the feet of people located in both the front and rear of the vehicle and which can be adjusted to accommodate various conditions.

In many inclement situations, a person's feet are covered with snow or ice. As the feet are warmed, this snow or ice will melt and may become a problem if the water is not properly conducted away to a proper area. The floor mats of a motor vehicle can become soaked and may mildew under some conditions.

Therefore, there is a need for a system that can efficiently warm the feet of people and which can also conduct water into desired collection areas.

Still further, it is desirable to isolate any heating elements from both the feet of the users and the mats of the vehicle to avoid discomfort or damage.

Therefore, there is a need for a system that can efficiently warm the feet of people but which has the heating elements protected from contact with either the feet of the users or the support elements in a vehicle.

PRINCIPAL OBJECTS OF THE INVENTION

It is a main object of the present invention to provide a system that can maintain a person's feet warm even under severe conditions.

It is another object of the present invention to provide a system that can maintain a person's feet warm and which can be efficiently used in a motor vehicle, such as an automobile.

It is another object of the present invention to provide a system that can efficiently warm the feet of people located in both the front and rear of the vehicle.

It is another object of the present invention to provide a system that can efficiently warm the feet of people located in both the front and rear of the vehicle and which can be adjusted to accommodate various conditions.

It is another object of the present invention to provided a system that can efficiently warm the feet of people and which can also conduct water into desired collection areas.

It is another object of the present invention to provide a system that can efficiently warm the feet of people but which has the heating elements protected from contact with either the feet of the users or the support elements in a vehicle.

SUMMARY OF THE INVENTION

These, and other, objects are achieved by a foot warming system that includes a plurality of mats that can be heated by electrical resistance heaters embedded in the mats and which are powered from a power system of a vehicle. The mats include crowns and gutters so water generated by the heat from the mats can be collected and disposed of in a desired manner. A plurality of mats are included so that mats can be located at a plurality of locations in the vehicle whereby a plurality of people can be warmed at one time.

Using the foot warming system embodying the present invention will permit a person to use a motor vehicle to maintain his or her feet warm even if special clothing is insufficient for this purpose no matter whether the person is located in the front of the vehicle or in the rear of the vehicle. The system can be easily connected to the power is system of the vehicle and can be easily adjusted to accommodate various conditions. Any water generated by melting snow or ice will be conducted into gutters or the like which can be dumped when necessary. The water generated by melting snow or ice from a person's feet can thus be disposed of in a desired manner and in a desired location and will not interfere with conditions inside the vehicle. The heating elements are embedded in the mats and a layer of carpet-like material is interposed between the heating elements and the feet of the user and a vinyl layer is interposed between the heating elements and any floor mat that might support the heated mat so that the heating elements will not come directly in contact with either the feet of the user or the vehicle whereby discomfort or damage will be avoided due to contact with the heating elements.

BRIEF DESCRIPTION OF THE DRAWING FIGURES

FIG. 1 is a perspective view of a foot heating system embodying the present invention.

FIG. 2 is a plan view of a mat as seen along line 2—2 of FIG. 1.

FIG. 3 illustrates a power connection and a control element used in the foot heating system embodying the present invention.

FIG. 4 is an elevational view of a mat taken along line 4—4 of FIG. 1 illustrating the layers of the mat as well as the crown and the gutter of the mat.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a foot heating system 10.

System 10 comprises a motor vehicle 12, such as a car, a truck or the like, and which has a front seat 14, a rear seat 16, a driver's seat 18, a power system 20, a cigarette lighter type power outlet 22 electrically connected to the power system 20, and a floor, such as floor 24, associated with each seat. The elements of the vehicle are not shown in detail since those skilled in the land vehicle art will understand what these elements are based on the teaching of the present disclosure.

System 10 comprises a first mat 30 which includes a first surface 32, that is a top surface when first mat 30 is resting on the floor 24 of motor vehicle 12 as indicated in FIG. 1, and a second surface 34, that is a bottom surface when first mat 30 is resting on the floor 24 of motor vehicle 12. Mat 30 further includes a first end edge 36, a second end edge 38, a first side edge 40, a second side edge 42, a first transverse axis 44 which extends between first side edge 40 and second side edge 42, a third end edge 46 located between first end edge 36 and second end edge 38, a third side edge 50 which extends between third end edge 46 and second end edge 38, and a second transverse axis 54 which extends between first side edge 40 and third side edge 50. Second transverse axis 54 is longer than first transverse axis 44.

First mat 30 includes a vinyl layer 60 which will be interposed between first mat 30 and the floor 24 of the vehicle 12. Vinyl layer 60 has a crown 64 near the middle thereof. Vinyl layer 60 further includes a gutter 66 defined adjacent to the side edges of first mat 30.

Water associated with melting snow or ice will flow into the gutter 66 and be collected therein. The crown 64 will create a flow of the water to the gutter 66. The collected water will be prevented from flowing onto the floor 24 of the vehicle 12 and can be disposed of as suitable.

First mat 30 further includes a cloth-like layer 70 on vinyl layer 60 and an electrical resistance heater element 80 having coils 82 and 84 is embedded in vinyl layer 60. An electrical plug 86 is located in one edge of first mat 30.

System 10 further comprises a second mat 100 which includes a first surface 102 that is a top surface when second mat 100 is resting on the floor 24 of motor vehicle 12, a second surface 104 that is a bottom surface when second mat 100 is resting on the floor 24 of motor vehicle 12, a first end edge 106, a second end edge 108, a first side edge 110, and a second side edge 112. Second side edge 112 extends at an oblique angle, θ, with respect to second end edge 108. A first transverse axis 114 extends between first side edge 110 and second side edge 112. Mat 100 further includes a third side edge 120 which extends between second side edge 112 and second end edge 108. A second transverse axis 122 extends between first side edge 110 and third side edge 120. Second transverse axis 122 is longer than first transverse axis 114.

Second mat 100 further includes a vinyl layer 130 which has a crown 132 located near the middle thereof. Vinyl layer 130 further includes a gutter 134 defined adjacent to the side edges of second mat 100 and which circumnavigates second mat 100, as does the gutters of the other mats included in system 10.

A cloth-like layer 136 is located on vinyl layer 130, and an electrical resistance heater element 138 is embedded in vinyl layer 130. All of the electrical resistance heater elements of the mats of system 10 are identical. Element 138 has an electrical plug 140 located in one edge of second mat 100.

System 10 further comprises a third mat 150 which includes a first surface 152 that is a top surface when third mat 150 is resting on the floor 24 of motor vehicle 12, a second surface 154 that is a bottom surface when third mat 150 is resting on the floor 24 of motor vehicle 12, a first end edge 156, a second end edge 158, a first side edge 160, a second side edge 162, and a transverse axis 163 which extends between first side edge 160 and second side edge 162. Third mat 150 further includes a vinyl layer 164 which includes a crown 166 near the middle thereof and a gutter 168 defined adjacent to the side edges of third mat 150 to circumnavigate that mat in a manner similar to the other mats included in system 10.

A cloth-like layer 170 is located on vinyl layer 160 and an electrical resistance heater element 172 is embedded in vinyl layer 160. An electrical plug 174 is located in one edge of third mat 150.

System 10 further includes a fourth mat 180 which is similar to third mat 150 and which includes a first surface 182 that is a top surface when fourth mat 180 is resting on the floor 24 of motor vehicle 12, a second surface 184 that is a bottom surface when fourth mat 180 is resting on the floor 24 of motor vehicle 12, a first end edge 186, a second end edge 188, a first side edge 190, a second side edge 192, and a transverse axis 194 which extends between first side edge 190 and second side edge 192. Mats 150 and 180 are rectangular in outer peripheral shape.

Mat 180 further includes a vinyl layer 196 which includes a crown 198 near the middle thereof. Vinyl layer 196 further includes a gutter 200 defined adjacent to the side edges thereof.

Fourth mat 180 further includes a cloth-like layer 201 on vinyl layer 196. An electrical resistance heater element 202 is embedded in vinyl layer 196 of fourth mat 180 and has an electrical plug 204 located in one edge thereof.

A power connection element 210 is shaped and adapted to be accommodated in cigarette lighter-type power outlet 22 of motor vehicle 12. A power level control 212 is electrically connected to power connection element 210 and is used to adjust the power level in system 10 between a high level 214, a low level 216, and a medium level 218. Power level control 212 can be a rheostat element or the like.

An electrical connection 220 electrically connects the electrical resistance heater of each of the mats to power level control 212 to receive power from power system 20 of motor vehicle 12 via power level control 212.

As can be understood from the teaching of the foregoing disclosure, mats can be located throughout a motor vehicle for warming the feet of anyone sitting in the vehicle. If snow or lice is melted during the warming process, water is guided to gutters where it can be collected and disposed of at a later time in a suitable location.

It is to be understood that while certain forms of the present invention have been illustrated and described herein, it is not to be limited to the specific forms or arrangements of parts described and shown.

What is needed and desired to be covered by Letters Patent is as follows:

1. A foot heating system comprising:
   (a) a motor vehicle having a front seat, a rear seat, a driver's seat, a power system, a cigarette lighter-type power outlet electrically connected to the power system, and a floor associated with each seat;
   (b) a first mat which includes
      (1) a first surface that is a top surface when said first mat is resting on the floor of said motor vehicle,
      (2) a second surface that is a bottom surface when said first mat is resting on the floor of said motor vehicle,
      (3) a first end edge,
      (4) a second end edge,
      (5) a first side edge,
      (6) a second side edge,
      (7) a first transverse axis which extends between the first side edge of said first mat and the second side edge of said first mat,
      (8) a third end edge located between the first end edge of said first mat and the second end edge of said first mat,
      (9) a third side edge which extends between the third end edge of said first mat and the second end edge of said first mat,
      (10) a second transverse axis which extends between the first side edge of said first mat and the third side edge of said first mat, the second transverse axis of said first mat being longer than the first transverse axis of said first mat,
      (11) a vinyl layer, the vinyl layer of said first mat having a crown near the middle of the vinyl layer of said first mat, the vinyl layer of said first mat further including a gutter defined adjacent to the side edges of said first mat,
      (12) a cloth-like layer on the vinyl layer of said first mat, and
      (13) an electrical resistance heater element embedded in the vinyl layer of said first mat and having an electrical plug located in one edge of said first mat;
   (c) a second mat which includes
      (1) a first surface that is a top surface when said second mat is resting on the floor of said motor vehicle,
      (2) a second surface that is a bottom surface when said second mat is resting on the floor of said motor vehicle,
      (3) a first end edge,
      (4) a second end edge,
      (5) a first side edge,
      (6) a second side edge, the second side edge of said second mat extending at an oblique angle with respect to the second end edge of said second mat,
      (7) a first transverse axis which extends between the first side edge of said second mat and the second side edge of said second mat,
      (8) a third side edge which extends between the second side edge of said second mat and the second end edge of said second mat,
      (9) a second transverse axis which extends between the first side edge of said second mat and the third side edge of said second mat, the second transverse axis of said second mat being longer than the first transverse axis of said second mat,
      (10) a vinyl layer, the vinyl layer of said second mat having a crown near the middle of the vinyl layer of said second mat, the vinyl layer of said second mat further including a gutter defined adjacent to the side edges of said second mat,
      (11) a cloth-like layer on the vinyl layer of said second mat, and
      (12) an electrical resistance heater element embedded in the vinyl layer of said second mat and having an electrical plug located in one edge of said second mat;
   (d) a third mat which includes
      (1) a first surface that is a top surface when said third mat is resting on the floor of said motor vehicle,
      (2) a second surface that is a bottom surface when said third mat is resting on the floor of said motor vehicle,
      (3) a first end edge,
      (4) a second end edge,
      (5) a first side edge,
      (6) a second side edge,
      (7) a transverse axis which extends between the first side edge of said third mat and the second side edge of said third mat,
      (8) a vinyl layer, the vinyl layer of said third mat having a crown near the middle of the vinyl layer of said third mat, the vinyl layer of said third mat further including a gutter defined adjacent to the side edges of said third mat,
      (9) a cloth-like layer on the vinyl layer of said third mat, and
      (10) an electrical resistance heater element embedded in the vinyl layer of said third mat and having an electrical plug located in one edge of said third mat;
   (e) a power connection element that is shaped and adapted to be accommodated in the cigarette lighter-type power outlet of said motor vehicle;
   (f) a power level control electrically connected to said power connection element; and
   (g) an electrical connection electrically connecting the electrical resistance heater of each of said mats to said power level control to receive power from the power system of said motor vehicle via said power level control.

2. The foot heating system as described in claim 1 wherein said third mat is rectangular in shape.

3. The foot heating system as described in claim 1 further comprising a fourth mat which includes
   (a) a first surface that is a top surface when said fourth mat is resting on the floor of said motor vehicle;
   (b) a second surface that is a bottom surface when said fourth mat is resting on the floor of said motor vehicle;
   (c) a first end edge;
   (d) a second end edge;
   (e) a first side edge;
   (f) a second side edge;
   (g) a transverse axis which extends between the first side edge of said fourth mat and the second side edge of said fourth mat;
   (h) a vinyl layer, the vinyl layer of said fourth mat having a crown near the middle of the vinyl layer of said fourth mat, the vinyl layer of said fourth mat further including a gutter defined adjacent to the side edges of said fourth mat;
   (i) a cloth-like layer on the vinyl layer of said fourth mat; and
   (j) an electrical resistance heater element embedded in the vinyl layer of said fourth mat and having an electrical plug located in one edge of said fourth mat.

* * * * *